United States Patent
Lee et al.

(10) Patent No.: US 12,476,050 B2
(45) Date of Patent: Nov. 18, 2025

(54) MULTILAYER ELECTRONIC COMPONENT

(71) Applicant: SAMSUNG ELECTRO-MECHANICS CO., LTD., Suwon-si (KR)

(72) Inventors: Jong Ho Lee, Suwon-si (KR); Kyoung Jin Cha, Suwon-si (KR); Berm Ha Cha, Suwon-si (KR); Hyung Jong Choi, Suwon-si (KR); Jin Woo Chun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 155 days.

(21) Appl. No.: 18/231,324

(22) Filed: Aug. 8, 2023

(65) Prior Publication Data

US 2024/0222029 A1 Jul. 4, 2024

(30) Foreign Application Priority Data

Dec. 29, 2022 (KR) .................. 10-2022-0189483

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/224* (2013.01)

(58) Field of Classification Search
CPC .......... H01G 4/30; H01G 4/008; H01G 4/012; H01G 4/12; H01G 4/224; H01G 4/1227;
(Continued)

(56) References Cited

U.S. PATENT DOCUMENTS 9,099,244 B2 * 8/2015 Suzuki ................ H01G 4/1245
9,728,333 B2 * 8/2017 Yamaguchi ............. H01G 4/30
(Continued)

FOREIGN PATENT DOCUMENTS

KR 10-1581925 B1 12/2015
KR 10-1607536 B1 3/2016
(Continued)

OTHER PUBLICATIONS

Suzuki et al., Effect of alloying Ni inner electrodes on the leakage current degradation of BaTiO3-based multilayer ceramic capacitors (2020, Applied Physics Letters).
(Continued)

*Primary Examiner* — Dion R. Ferguson
(74) *Attorney, Agent, or Firm* — Morgan, Lewis & Bockius LLP

(57) ABSTRACT

A multilayer electronic component includes a body including a capacitance formation portion in which a plurality of dielectric layers and a plurality of internal electrodes are alternately disposed in a first direction, a first cover portion disposed on one surface of the capacitance formation portion in the first direction and including a dielectric layer, and a second cover portion disposed on the other surface of the capacitance formation portion in the first direction and including a dielectric layer; and an external electrode disposed on the body, wherein a molar ratio of Sn/(Ni+Sn) measured in a central portion of an internal electrode disposed closest to the first cover portion or the second cover portion is 0.00160 or more and 0.0230 or less, and a molar ratio of Sn/(Ni+Sn) measured in a central portion of at least one internal electrode, among the plurality of internal electrodes, is 0.00066 or less.

16 Claims, 6 Drawing Sheets

(51) Int. Cl.
*H01G 4/012* (2006.01)
*H01G 4/12* (2006.01)
*H01G 4/224* (2006.01)

(58) Field of Classification Search
CPC .... H01G 4/0085; H01G 4/1209; H01G 4/232; H01G 4/2325
See application file for complete search history.

(56) References Cited

U.S. PATENT DOCUMENTS

| | | | |
|---|---|---|---|
| 9,837,210 B2 | 12/2017 | Doi et al. | |
| 11,605,505 B2 * | 3/2023 | Cha | H01G 4/1227 |
| 2013/0321980 A1 * | 12/2013 | Suzuki | H01G 4/1227 |
| | | | 29/25.42 |
| 2015/0155098 A1 * | 6/2015 | Yamaguchi | H01G 13/00 |
| | | | 156/89.16 |
| 2016/0155571 A1 | 6/2016 | Doi et al. | |
| 2020/0058444 A1 | 2/2020 | Cha et al. | |
| 2020/0194178 A1 * | 6/2020 | Choi | H01G 4/248 |
| 2021/0057164 A1 * | 2/2021 | Cha | H01G 4/1227 |
| 2022/0157531 A1 | 5/2022 | Lee et al. | |
| 2022/0238280 A1 | 7/2022 | Masuda et al. | |
| 2023/0207196 A1 * | 6/2023 | Doi | H01G 4/248 |
| | | | 174/260 |
| 2024/0222029 A1 * | 7/2024 | Lee | H01G 4/0085 |

FOREIGN PATENT DOCUMENTS

| | | | |
|---|---|---|---|
| KR | 10-1790127 B1 | 10/2017 | |
| KR | 10-2019-0121149 A | 10/2019 | |
| KR | 20220066506 A * | 5/2022 | |
| KR | 10-2022-0108721 A | 8/2022 | |
| WO | WO-2014024538 A1 * | 2/2014 | H01G 13/00 |

OTHER PUBLICATIONS

Suzuki et al., Suppressive effect of Ni—Sn internal electrode at the anode on the leakage current degradation of BaTiO3-based multilayer ceramic capacitors (2021, Applied Physics Letters).

Partial European Search Report issued on Feb. 19, 2024 in Europeann Patent Application No. 23190551.4.

* cited by examiner

MULTILAYER ELECTRONIC COMPONENT

CROSS-REFERENCE TO RELATED APPLICATION (S)

This application claims benefit of priority to Korean Patent Application No. 10-2022-0189483 filed on Dec. 29, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an image display device, including a liquid crystal display (LCD), a plasma display panel (PDP), or the like, a computer, a smartphone, or a mobile phone, serving to charge or discharge electricity therein or therefrom.

The multilayer ceramic capacitor has a small size, implements high capacitance, and is easily mounted, and may thus be used as a component of various electronic devices. There has been increasing demand for a multilayer ceramic capacitor to have a reduced size and higher capacitance as each of various electronic devices such as a computer, a mobile device, and the like have a reduced size and higher output.

In order to achieve miniaturization and high capacitance of the multilayer ceramic capacitor, thicknesses of a dielectric layer and an internal electrode should be reduced to increase the number of layers to be stacked.

However, when a dielectric layer is thinned, leakage current may increase, as an electric field applied at the same voltage increases.

In addition, a central portion of a body may have a higher amount of residual carbon and a higher amount of residual sulfur, compared to an edge of the body, and the carbon and the sulfur may be rapidly oxidized at a high temperature, to destabilize a surface of an internal electrode, thereby reducing connectivity of the internal electrode.

In this regard, an attempt has been made to suppress leakage current and improve connectivity of the internal electrode by adding Sn to the internal electrode or the dielectric layer, to form a region having a high Sn amount at an interface between the internal electrode and the dielectric layer.

However, when Sn is added, rapid shrinkage may occur in length and width directions during a sintering process due to an increase in dielectric sinterability, and accordingly, a thickness of the dielectric layer may increase, resulting in a decrease in capacitance.

Therefore, it is necessary to develop a method capable of improving reliability while suppressing side effects caused by the addition of Sn.

SUMMARY

An aspect of the present disclosure is to provide a multilayer electronic component having excellent reliability.

An aspect of the present disclosure is to provide a multilayer electronic component having improved connectivity of an internal electrode.

An aspect of the present disclosure is to suppress a decrease in capacitance due to addition of Sn.

However, objects of the present disclosure are not limited to the above, and will be more easily understood in the process of describing specific embodiments of the present disclosure.

According to an aspect of the present disclosure, a multilayer electronic component includes a body including a capacitance formation portion in which a plurality of dielectric layers and a plurality of internal electrodes are alternately disposed in a first direction, a first cover portion disposed on one surface of the capacitance formation portion in the first direction and including a dielectric layer, and a second cover portion disposed on the other surface of the capacitance formation portion in the first direction and including a dielectric layer; and an external electrode disposed on the body. If, among the plurality of internal electrodes, an internal electrode disposed closest to the first cover portion is IE1 and an internal electrode disposed closest to the second cover portion is IE2, a molar ratio of Sn/(Ni+Sn) measured in at least one of a central portion of IE1 and a central portion of IE2 is 0.00160 or more and 0.0230 or less, and a molar ratio of Sn/(Ni+Sn) measured in a central portion of at least one internal electrode, among the plurality of internal electrodes, is 0.00066 or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
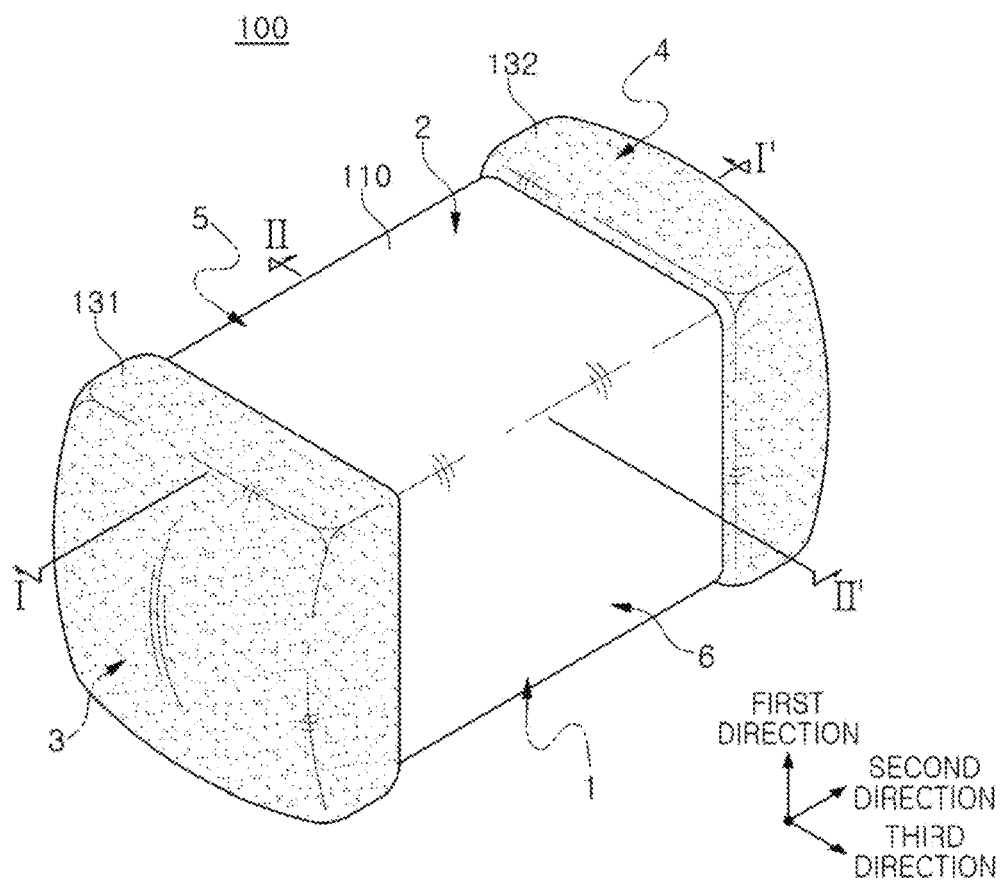
FIG. 1 is a perspective view schematically illustrating a multilayer electronic component according to an embodiment of the present disclosure.

Hereinafter, embodiments of the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an embodiment of the present disclosure.

Figure 2:
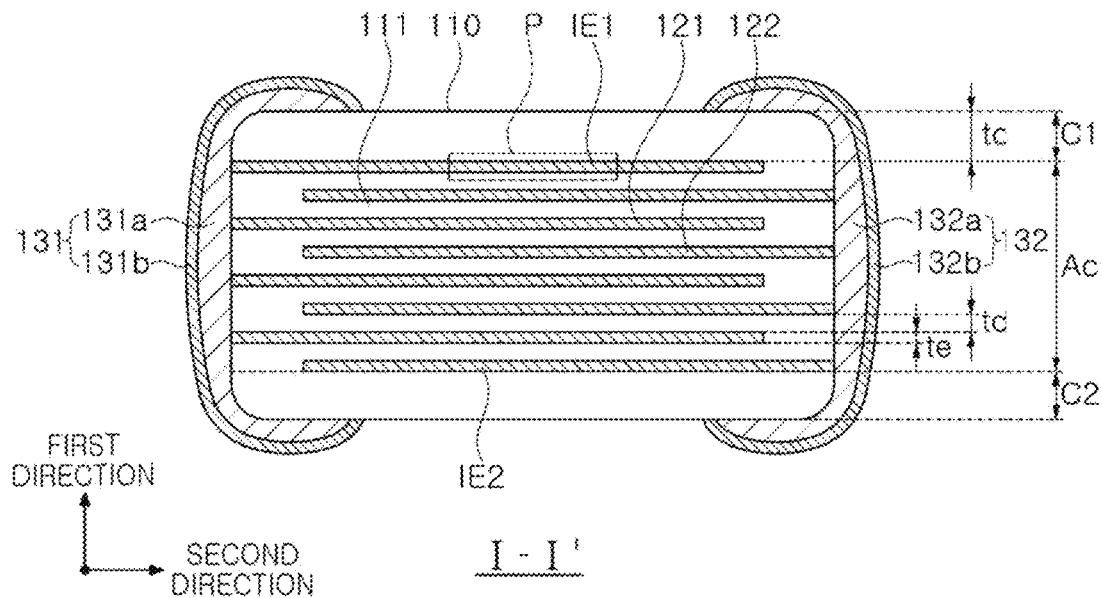
FIG. 2 is a cross-sectional view schematically illustrating the multilayer electronic component of FIG. 1, taken along line I-I'.

FIG. 2 is a cross-sectional view schematically illustrating the multilayer electronic component of FIG. 1, taken along line I-I'.

Figure 3:
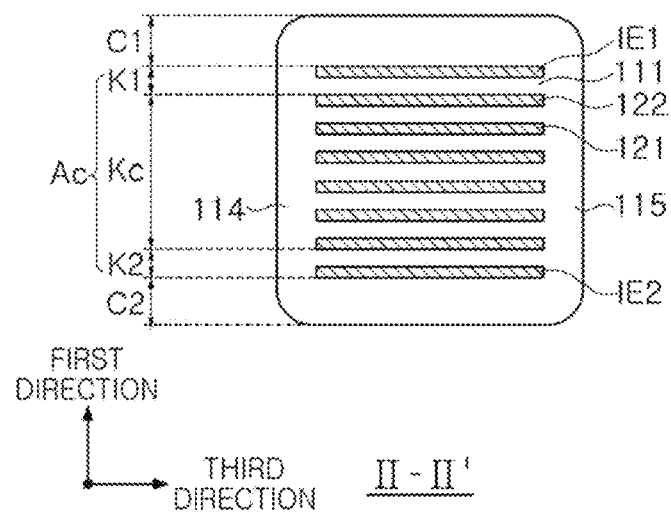
FIG. 3 is a cross-sectional view schematically illustrating the multilayer electronic component of FIG. 1, taken along line II-II'.

FIG. 3 is a cross-sectional view schematically illustrating the multilayer electronic component of FIG. 1, taken along line II-II'.

Figure 4:
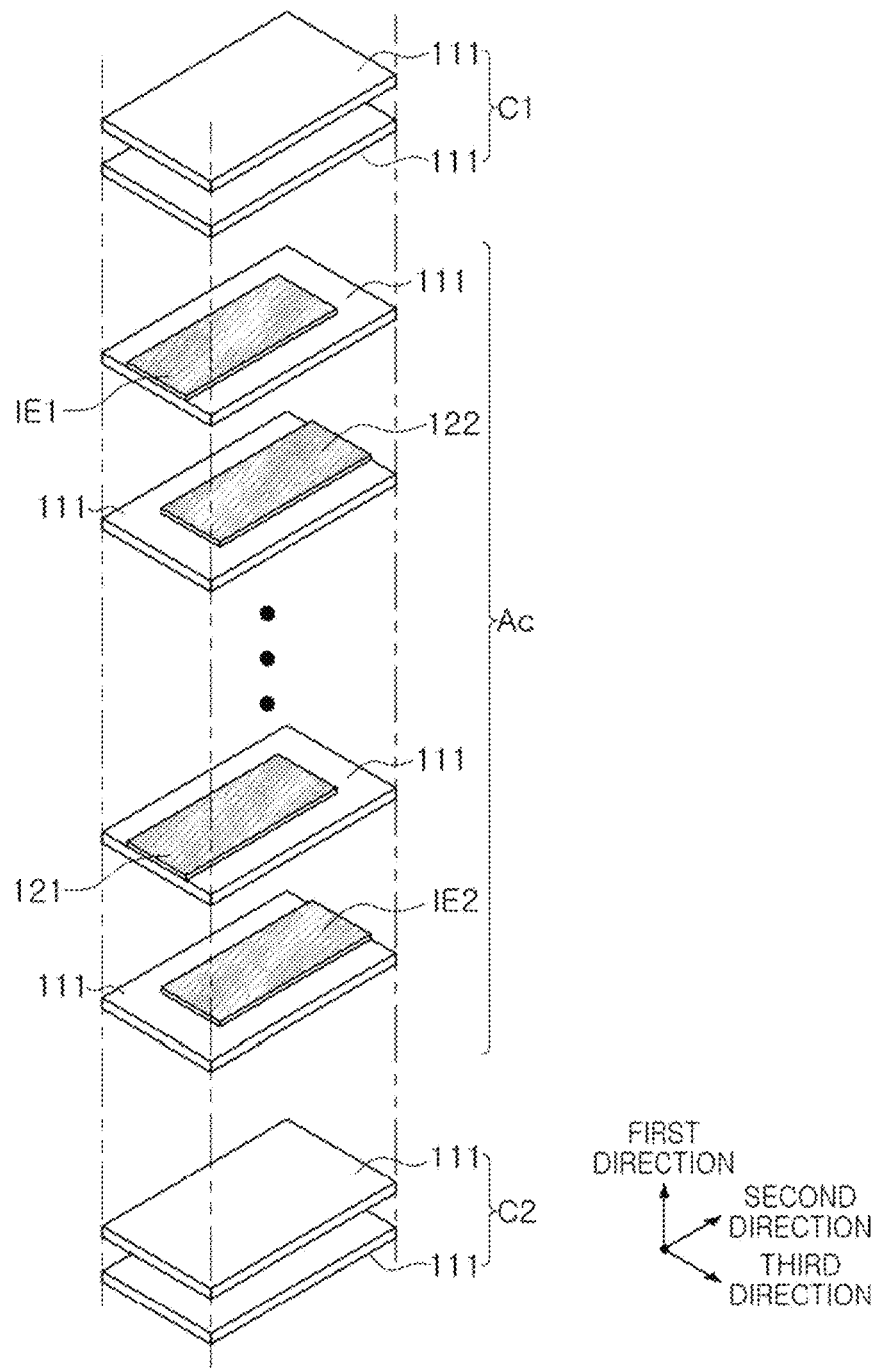
FIG. 4 is an exploded perspective view schematically illustrating a body of a multilayer electronic component according to an embodiment of the present disclosure.

FIG. 4 is an exploded perspective view schematically illustrating a body of a multilayer electronic component according to an embodiment of the present disclosure.

Figure 5:
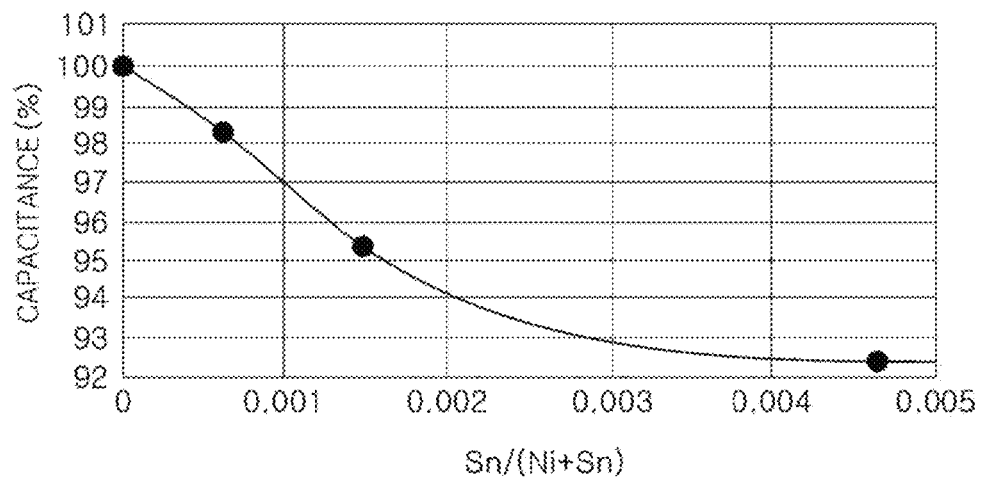
FIG. 5 is a graph illustrating a decrease in capacitance according to an Sn amount included in an internal electrode.

FIG. 5 is a graph illustrating a decrease in capacitance according to an Sn amount included in an internal electrode.

Figure 6:
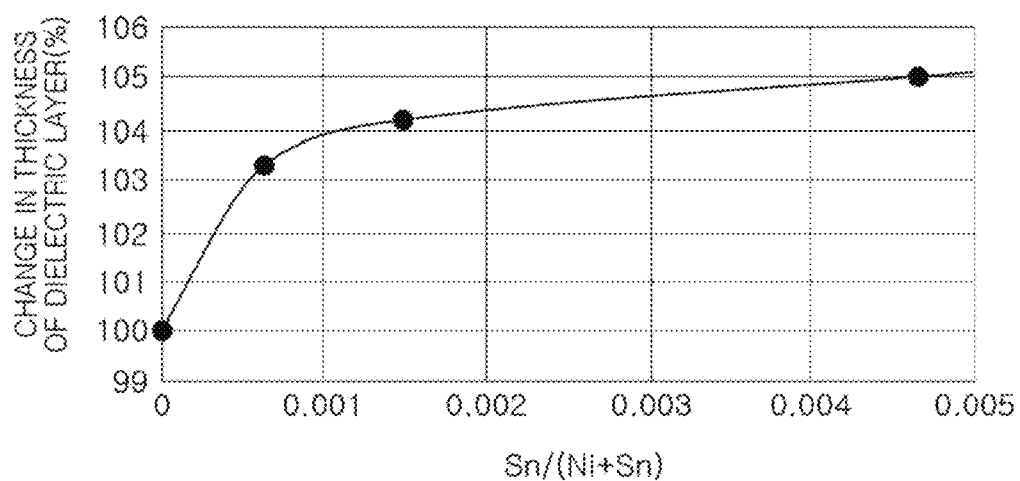
FIG. 6 is a graph illustrating a change in thickness of a dielectric layer according to an Sn amount.

FIG. 6 is a graph illustrating a change in thickness of a dielectric layer according to an Sn amount.

Figure 7:
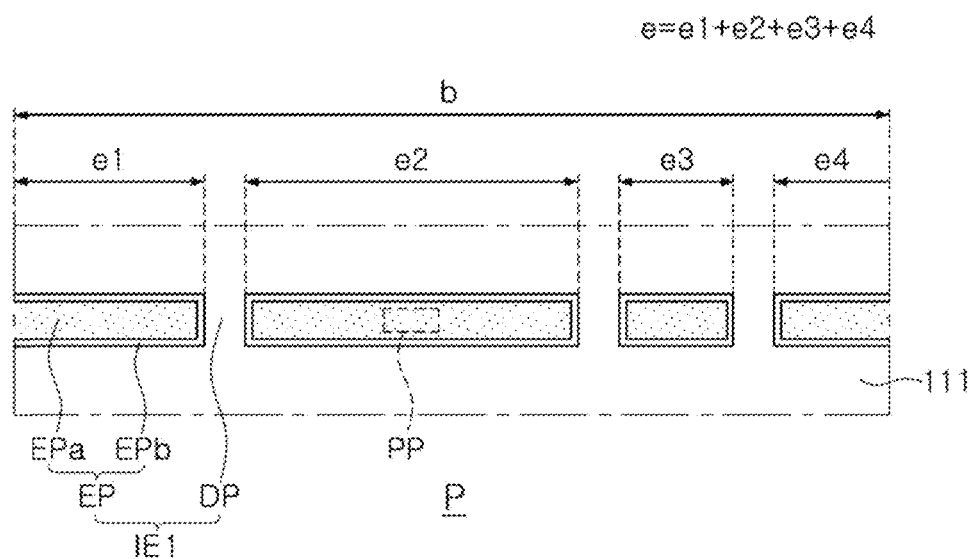
FIG. 7 is an enlarged view of portion P of FIG. 2.

FIG. 7 is an enlarged view of portion P of FIG. 2.

Hereinafter, a multilayer electronic component 100 according to an embodiment of the present disclosure will be described in detail with reference to FIGS. 1 to 7.

A multilayer electronic component 100 according to an embodiment of the present disclosure may include a body 110 including a capacitance formation portion Ac in which a plurality of dielectric layers 111 and a plurality of internal electrodes 121 and 122 are alternately disposed in a first direction, a first cover portion C1 disposed on one surface of the capacitance formation portion in the first direction and including a dielectric layer, and a second cover portion C2 disposed on the other surface of the capacitance formation portion in the first direction and including a dielectric layer; and an external electrode (131 and 132) disposed on the body. If, among the plurality of internal electrodes 121 and 122, an internal electrode disposed closest to the first cover portion C1 is IE1 and an internal electrode disposed closest to the second cover portion C2 is IE2, a molar ratio of Sn/(Ni+Sn) measured in at least one of a central portion of IE1 and a central portion of IE2 may be 0.00160 or more and 0.0230 or less, and a molar ratio of Sn/(Ni+Sn) measured in a central portion of at least one internal electrode, among the plurality of internal electrodes, may be 0.00066 or less.

When a dielectric layer is thinned for miniaturization and high capacitance, leakage current may increase, as an electric field applied at the same voltage increases. In addition, a central portion of a body may have a higher amount of residual carbon and a higher amount of residual sulfur, compared to an edge of the body, and the carbon and the sulfur may be rapidly oxidized at a high temperature, to destabilize a surface of an internal electrode, thereby reducing connectivity of the internal electrode.

In this regard, an attempt has been made to suppress leakage current and improve connectivity of the internal electrode by adding Sn to the internal electrode or the dielectric layer, to form a region having a high Sn amount on an interface between the internal electrode and the dielectric layer. When Sn is added, rapid shrinkage may occur in length and width directions during a sintering process due to an increase in dielectric sinterability, and accordingly, a thickness of the dielectric layer may increase, resulting in a decrease in capacitance.

According to an embodiment of the present disclosure, while securing reliability by increasing amounts of the internal electrodes IE1 and IE2 adjacent to the cover portions C1 and C2, an Sn amount of an internal electrode spaced apart from the cover portions C1 and C2 may be reduced to suppress a decrease in capacitance.

Hereinafter, each component of a multilayer electronic component 100 according to an embodiment of the present disclosure will be described in detail.

In the body 110, the dielectric layer 111 and the internal electrodes 121 and 122 may be alternately stacked.

Although the specific shape of the body 110 is not particularly limited, as illustrated, the body 110 may have a hexahedral shape or a shape similar thereto. Due to shrinkage of ceramic powder particles included in the body 110 during a sintering process, the body 110 may not have a perfectly straight hexahedral shape, but may have a substantially hexahedral shape.

The body 110 may include first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

As a margin region on which the internal electrodes 121 and 122 are not disposed overlaps the dielectric layer 111, a step difference may be generated due to thicknesses of the internal electrodes 121 and 122, such that a corner connecting the first surface and the third to fifth surfaces and/or a corner connecting the second surface and the third to fifth surfaces have a shape contracted toward a center of the body 110 in the first direction, when viewed from the first surface or the second surface. Alternatively, due to contract behavior of the body during a sintering process, a corner connecting the first surface 1 and the third to sixth surfaces 3, 4, 5, and 6 and/or a corner connecting the second surface 2 and the third to sixth surfaces 3, 4, 5, and 6 may have a shape contracted toward the center of the body 110 in the first direction, when viewed from the first or second surface. Alternatively, to prevent a chipping defect or the like, edges connecting each surface of the body 110 may be rounded by performing a separate process, such that a corner connecting the first surface and the third to sixth surfaces and/or a corner connecting the second surface and the third to sixth surfaces have a round shape.

To suppress the step difference caused by the internal electrodes 121 and 122, after stacking, the internal electrodes may be cut to be exposed from the fifth and sixth surfaces 5 and 6 of the body, and, when margin portions 114 and 115 are formed by stacking a single dielectric layer or two or more dielectric layers on both side surfaces of the capacitance formation portion Ac in the third direction (width direction), a portion connecting the first surface and the fifth and sixth surfaces and a portion connecting the second surface and the fifth and sixth surfaces may not have a contracted shape.

A plurality of dielectric layers 111 forming the body 110 may be in a sintered state, and a boundary between adjacent dielectric layers 111 may be integrated to such an extent that it is difficult to identify the same without using a scanning electron microscope (SEM).

According to an embodiment of the present disclosure, a raw material for forming the dielectric layer 111 is not particularly limited, as long as sufficient capacitance may be obtained. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, $Ba(Ti_{1-y}Zr_y)O_3$ $(0<y<1)$, or the like, in which calcium (Ca), zirconium (Zr), or the like is partially dissolved into $BaTiO_3$, or the like.

As the raw material for forming the dielectric layer 111, various ceramic additives, organic solvents, binders, dispersants, or the like may be added to powders such as barium titanate ($BaTiO_3$) or the like according to the purpose of the present disclosure.

An average thickness td of the dielectric layer 111 does not need to be particularly limited.

In general, when a dielectric layer is formed thinly to have a thickness of less than 0.6 μm, in particular, when the thickness of the dielectric layer is 0.37 μm or less, there may be a risk of deterioration in reliability.

According to an embodiment of the present disclosure, since reliability may be improved by controlling amounts of the internal electrodes IE1 and IE2 adjacent to the cover portions C1 and C2, excellent reliability may be secured even when an average thickness of at least one of the dielectric layers 111 is 0.37 μm or less.

Therefore, when the average thickness of at least one of the dielectric layers 111 is 0.37 μm or less, a reliability improvement effect according to the present disclosure may be more remarkable.

The average thickness td of the dielectric layer 111 may mean an average thickness of the dielectric layer 111 disposed between the first and second internal electrodes 121 and 122.

The average thickness of the dielectric layer 111 may be measured by scanning an image of a cross-section of the body 110 in length and thickness directions (an L-T plane) with a scanning electron microscope (SEM) at a magnification of 10,000. More specifically, an average value thereof may be determined by measuring a thickness of one (1) dielectric layer at thirty (30) equally spaced points in the length direction in the scanned image. The thirty (30) equally spaced points may be designated in the capacitance formation portion Ac. In addition, when such an average value is determined by extensively using measurements of average values to ten (10) dielectric layers, the average thickness of the dielectric layer may be more generalized.

The body 110 may include a capacitance formation portion Ac in which a plurality of dielectric layers 111 and a plurality of internal electrodes 121 and 122 are alternately disposed in a first direction, a first cover portion C1 disposed on one surface of the capacitance formation portion in the first direction and including a dielectric layer, and a second cover portion C2 disposed on the other surface of the capacitance formation portion in the first direction and including a dielectric layer.

The capacitance formation portion Ac may be a portion contributing to capacitance formation of the capacitor, and may be formed by repeatedly stacking the plurality of first and second internal electrodes 121 and 122 with the dielectric layer 111 interposed therebetween.

The first cover portion C1 and the second cover portion C2 may be formed by stacking a single dielectric layer or two or more dielectric layers on upper and lower surfaces of the capacitance formation portion Ac, respectively, in the thickness direction, and may basically play a role in preventing damage to the internal electrodes due to physical or chemical stress.

The first cover portion C1 and the second cover portion C2 may not include internal electrodes, and may include the same material as the dielectric layer 111. For example, the dielectric layers of the cover portions C1 and C2 and the dielectric layer 111 of the capacitance formation portion Ac do not necessarily need to be formed of the same material, and may include different materials, as necessary. The first cover portion C1 and the second cover portion C2 may include a ceramic material, and may include, for example, a barium titanate ($BaTiO_3$)-based ceramic material.

An average thickness of each of the cover portions C1 and C2 does not need to be particularly limited. To more easily achieve miniaturization and high capacitance of the multilayer electronic component, an average thickness tc of each of the cover portions C1 and C2 may be 15 μm or less. For example, an average thickness tc of the first cover portion C1 may be 15 μm or less, and an average thickness tc of the second cover portion C2 may also be 15 μm or less. In addition, according to an embodiment of the present disclosure, since reliability may be improved by controlling amounts of the internal electrodes IE1 and IE2 adjacent to the cover portions C1 and C2, excellent reliability may be secured even when the average thickness tc of each of the cover portions C1 and C2 is 15 μm or less.

The average thickness tc of each of the cover portions C1 and C2 may mean a size in the first direction, and may be an average value of sizes in the first direction, measured at five (5) equally spaced points above or below the capacitance formation portion Ac.

In addition, margin portions 114 and 115 may be disposed on side surfaces of the capacitance formation portion Ac.

The margin portions 114 and 115 may include a first margin portion 114 disposed on the fifth surface 5 of the body 110, and a second margin portion 115 disposed on the sixth surface 6 of the body 110. For example, the margin portions 114 and 115 may be disposed on both end surfaces of the body 110 in the width direction.

As illustrated in FIG. 3, the margin portions 114 and 115 may refer to regions between both ends of the first and second internal electrodes 121 and 122 and a boundary surface of the body 110, in a cross-section of the body 110 cut in the width-thickness (W-T) directions.

The margin portions 114 and 115 may basically serve to prevent damage to the internal electrodes due to physical or chemical stress, respectively.

The margin portions 114 and 115 may be prepared by forming internal electrodes by applying a conductive paste on a ceramic green sheet, except for regions in which the margin portions are formed.

In addition, to suppress a step difference caused by the internal electrodes 121 and 122, the side margin portions 114 and 115 may be cut to expose the fifth and sixth surfaces 5 and 6 of the body after stacking, respectively, and may be then formed by stacking a single dielectric layer or two or more dielectric layers in the third direction (width direction) on both end surfaces of the capacitance formation portion Ac.

Widths of the margin portions 114 and 115 are not particularly limited. An average width of each of the margin portions 114 and 115 may be 15 µm or less to more easily achieve miniaturization and high capacitance of the multilayer electronic component. In addition, according to an embodiment of the present disclosure, since reliability may be improved by controlling amounts of the internal electrodes IE1 and IE2 adjacent to the cover portions C1 and C2, excellent reliability may be secured, even when the average width of each of the margin portions 114 and 115 is 15 µm or less.

The average width of each of the margin portions 114 and 115 may mean an average size of each of the margin portions 114 and 115 in the third direction, and may be an average value of sizes of each of the margin portions 114 and 115 in the third direction, measured at five (5) equally spaced points on a side surface of the capacitance formation portion Ac.

The internal electrodes 121 and 122 may be alternately stacked with the dielectric layer 111.

The internal electrodes 121 and 122 may include first and second internal electrodes 121 and 122. The first and second internal electrodes 121 and 122 may be alternately disposed to oppose each other with the dielectric layer 111, constituting the body 110, interposed therebetween, and may be exposed from the third and fourth surfaces 3 and 4 of the body 110, respectively.

The first internal electrode 121 may be spaced apart from the fourth surface 4 and exposed from the third surface 3, and the second internal electrode 122 may be spaced apart from the third surface 3 and exposed from the fourth surface 4. A first external electrode 131 may be disposed on the third surface 3 of the body and connected to the first internal electrode 121, and a second external electrode 132 may be disposed on the fourth surface 4 of the body and connected to the second internal electrode 122.

For example, the first internal electrode 121 may be connected to the first external electrode 131 without being connected to the second external electrode 132, and the second internal electrode 122 may be connected to the second external electrode 132 without being connected to the first external electrode 131. Therefore, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 interposed therebetween.

According to an embodiment of the present disclosure, if, among the plurality of internal electrodes 121 and 122, an internal electrode disposed closest to the first cover portion C1 is IE1 and an internal electrode disposed closest to the second cover portion C2 is IE2, a molar ratio of Sn/(Ni+Sn) measured in at least one of a central portion of IE1 and a central portion of IE2 may be 0.00160 or more and 0.0230 or less, and a molar ratio of Sn/(Ni+Sn) measured in a central portion of at least one internal electrode, among the plurality of internal electrodes 121 and 122, may be 0.00066 or less.

FIG. 5 is a graph illustrating a decrease in capacitance according to an Sn amount included in an internal electrode. FIG. 6 is a graph illustrating a change in thickness of a dielectric layer according to an Sn amount. FIGS. 5 and 6 illustrate cases in which all internal electrodes included in a body have the same amount of Sn, and an X-axis is a molar ratio of Sn/(Ni+Sn) measured in a central portion of each of the internal electrodes. It can be seen that, as the molar ratio of Sn/(Ni+Sn) increases, capacitance gradually decreases and a thickness of dielectric layer gradually increases.

Internal electrodes IE1 and IE2 adjacent to cover portions C1 and C2 may be more easily permeable to moisture than internal electrodes located in a central portion of a body, may be most affected by an external environment, and may thus have the greatest influence on reliability. Therefore, in the present disclosure, reliability may be improved by controlling a molar ratio of Sn/(Ni+Sn) measured in a central portion of IE1 and a central portion of IE2 to be 0.00160 or more and 0.0230 or less. When the molar ratio of Sn/(Ni+Sn) measured in the central portion of IE1 and the central portion of IE2 is less than 0.00160, a reliability improvement effect may be insufficient. When the molar ratio of Sn/(Ni+Sn) measured in the central portion of IE1 and the central portion of IE2 exceeds 0.0230, an excessive Sn amount may be included therein, a melting point thereof may be too lowered, and connectivity of each of the internal electrodes may rather be deteriorated. When the connectivity of each of the internal electrodes of IE1 and IE2 is deteriorated, moisture or the like may penetrate into a region in which each of the internal electrodes is disconnected, resulting in a decrease in reliability.

Therefore, the molar ratio of Sn/(Ni+Sn) measured in at least one of the central portion of IE1 and the central portion of IE2 is preferably 0.00160 or more and 0.0230 or less, more preferably 0.00160 or more and 0.00684 or less, and still more preferably 0.00330 or more and 0.00684 or less.

In addition, at least one of the plurality of internal electrodes 121 and 122 may be controlled such that a molar ratio of Sn/(Ni+Sn) measured in a central portion is 0.00066 or less, to suppress a decrease in capacitance and an increase in thickness of a dielectric layer due to addition of Sn. In this case, an internal electrode having the molar ratio of Sn/(Ni+Sn) of 0.00066 or less, measured in the central portion, may have the molar ratio of Sn/(Ni+Sn) of 0.00010 or more to improve connectivity of the internal electrode.

When there is no internal electrode having a molar ratio of Sn/(Ni+Sn) of 0.00066 or less measured in a central portion, capacitance may decrease and a thickness of the dielectric layer may increase.

In an embodiment, a molar ratio of Sn/(Ni+Sn) measured in a central portion of an internal electrode, excluding IE1 and IE2, among the plurality of internal electrodes 121 and 122, may be 0.00066 or less. Therefore, a decrease in capacitance and an increase in thickness of a dielectric layer due to addition of Sn may be more effectively suppressed, and connectivity of the internal electrode may be improved.

The central portions of the internal electrodes 121 and 122 may be regions separated by 20 nm or more from an interface with the dielectric layer 111. Referring to FIG. 7, a molar ratio of Sn/(Ni+Sn) may be measured in a portion 'PP' spaced at least 20 nm from an interface with the dielectric layer.

In an embodiment, in the internal electrodes 121 and 122, an Sn amount in a region adjacent to the interface with the dielectric layer 111 may be twice larger or more than an Sn amount in the central portion.

Sn added to the internal electrodes 121 and 122 may be mainly distributed in the region adjacent to the interface with the dielectric layer. Therefore, leakage current may be suppressed and connectivity of an internal electrode may be more effectively improved. Referring to FIG. 7, among conductive portions EP of the internal electrode, an Sn amount may appear high in a region EPb adjacent to the interface with the dielectric layer, and an Sn amount may appear low in a region EPa spaced apart from the interface with the dielectric layer.

In this case, the region EPb adjacent to the interface with the dielectric layer 111, among the internal electrodes 121 and 122, may be an region within 5 nm from the interface with the dielectric layer 111, and the central portion of each of the internal electrodes 121 and 122 may be a region separated from the interface with the dielectric layer 111 by 20 nm or more.

In an embodiment, an internal electrode, except for IE1 and IE2, among the plurality of internal electrodes 121 and 122, may not include Sn. Therefore, a decrease in capacitance and an increase in thickness of a dielectric layer due to addition of Sn may hardly occur.

To suppress a decrease in capacitance and an increase in thickness of a dielectric layer due to addition of Sn while securing connectivity of each of the internal electrodes 121 and 122 at 80% or more, a molar ratio of Sn/(Ni+Sn) measured in a central portion of an internal electrode, except for IE1 and IE2, is preferably controlled to satisfy a molar ratio of 0.00010 or more and 0.00066 or less.

In an embodiment, connectivity of the internal electrode may be greater than 80%.

Referring to FIG. 7, the internal electrode IE1 may include a plurality of conductive portions EP, and may include a disconnection portion DP between adjacent conductive portions EP. If a total length of the internal electrode IE1 is b and lengths of the plurality of conductive portions EP are e1, e2, e3, and e4, respectively, connectivity for an internal electrode may be defined as a ratio of the sum (e=e1+e2+e3+e4) of lengths of the conductive portions relative to the total length b of the internal electrode IE1.

The connectivity for an internal electrode may be measured from images of cross-sections of the body 110 in the first and second directions, scanned with a scanning electron microscope (SEM) at a magnification of 10,000.

To secure the connectivity of each of the internal electrodes 121 and 122 to have 80% or more, it is preferable to control a molar ratio of Sn/(Ni+Sn) measured in a central portion of each of the internal electrodes to satisfy 0.00010 or more and 0.0230 or less. When the molar ratio of Sn/(Ni+Sn) measured in the central portion of the internal electrode is less than 0.00010, an effect of improving connectivity of the internal electrode by adding Sn may be insufficient, and when the molar ratio of Sn/(Ni+Sn) measured in the central portion of the internal electrode exceeds 0.0230, an excessive Sn amount may be included therein, a melting point thereof may be too lowered, and connectivity of each of the internal electrodes may rather be deteriorated.

In an embodiment, among the plurality of internal electrodes 121 and 122, a ratio of the number of internal electrodes of which a molar ratio of Sn/(Ni+Sn) measured in a central portion is 0.00066 or less may be 90% or more. Also, among the plurality of internal electrodes 121 and 122, a ratio of the number of internal electrodes of which a molar ratio of Sn/(Ni+Sn) measured in a central portion is 0.00010 or more to 0.00066 or less may be 90% or more. Therefore, a decrease in capacitance and an increase in thickness of a dielectric layer due to addition of Sn may be more effectively suppressed, and connectivity of the internal electrode may be improved.

In an embodiment, if a region of the capacitance formation portion adjacent to the first cover portion is K1, a region of the capacitance formation portion adjacent to the second cover portion is K2, and a region disposed between K1 and K2 is Kc, a molar ratio of Sn/(Ni+Sn) measured in a central portion of an internal electrode included in K1 and K2 may be 0.00160 or more and 0.0230 or less, and a molar ratio of Sn/(Ni+Sn) measured in a central portion of an internal electrode included in Kc may be 0.00066 or less. In this case, the molar ratio of Sn/(Ni+Sn) measured in the central portion of the internal electrode included in Kc may be 0.00010 or more and 0.00066 or less. Therefore, a decrease in capacitance and an increase in thickness of a dielectric layer due to addition of Sn may be more effectively suppressed, and connectivity of the internal electrode may be improved.

In addition, a ratio of a maximum size of Kc in the first direction relative to a maximum size of the capacitance formation portion Ac in the first direction may be 0.9 or more.

An average thickness te of each of the internal electrodes 121 and 122 does not need to be particularly limited.

In general, when a thickness of each of the internal electrodes is less than 0.6 μm, and particularly when a thickness of each of the internal electrodes is 0.35 μm or less, reliability may be deteriorated.

According to an embodiment of the present disclosure, since reliability may be improved by controlling amounts of the internal electrodes IE1 and IE2 adjacent to the cover portions C1 and C2, excellent reliability may be secured even when an average thickness of at least one of the internal electrodes 121 and 122 is 0.35 μm or less.

Therefore, when the average thickness of at least one of the internal electrodes 121 and 122 is 0.35 μm or less, effects according to the present disclosure may be more remarkable, and miniaturization and high capacitance of the multilayer electronic component may be more easily achieved.

The average thickness te of each of the internal electrodes 121 and 122 may mean an average thickness of each of the internal electrodes 121 and 122.

The average thickness of each of the internal electrodes 121 and 122 may be measured by scanning an image of a cross-section of the body 110 in length and thickness directions (an L-T plane) with a scanning electron microscope (SEM) at a magnification of 10,000. More specifically, an average value thereof may be determined by measuring a thickness of one (1) internal electrode at thirty (30) equally spaced points in the length direction in the scanned image. The thirty (30) equally spaced points may be designated in the capacitance formation portion Ac. In addition, when such an average value is determined by extensively using measurements of average values to ten (10) internal electrodes, the average thickness of each of the internal electrodes may be further generalized.

A method for controlling an Sn amount of the internal electrode for each position does not need to be particularly limited. For example, an Sn amount included in a ceramic green sheet may be adjusted differently for each position, or an Sn amount included in an internal electrode paste may be adjusted differently for each position, or both methods may be applied simultaneously.

Figure 8:
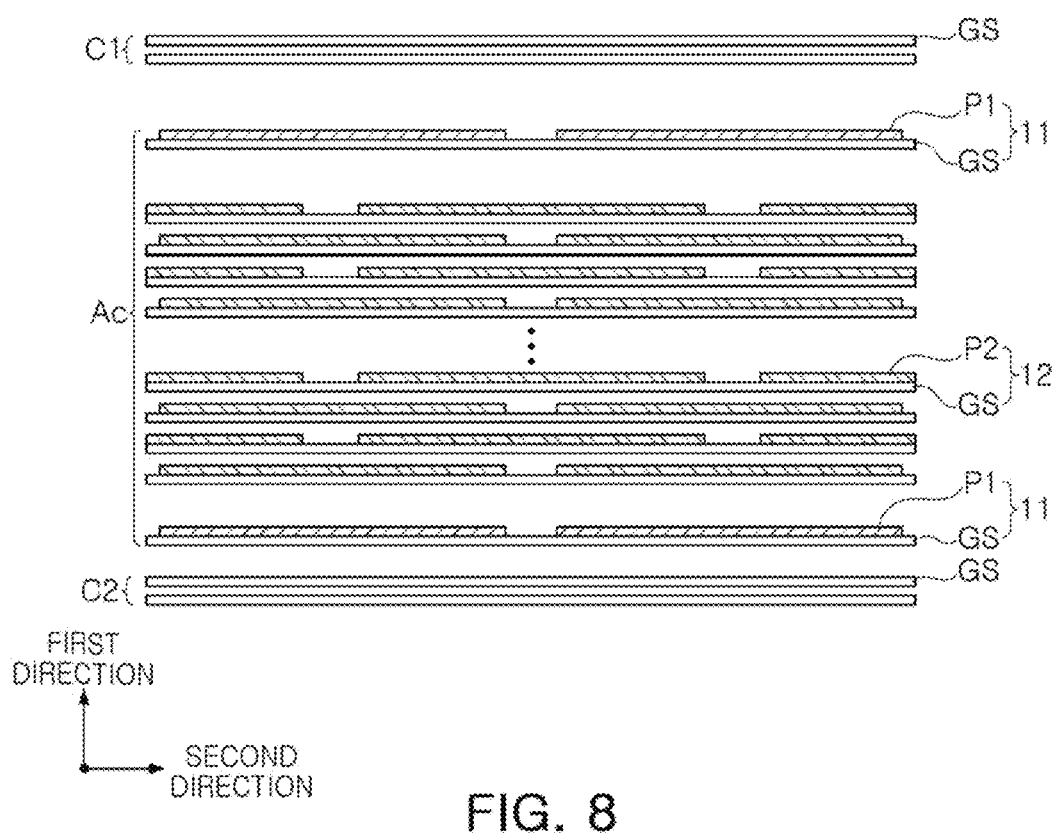
FIG. 8 is a view illustrating a method of manufacturing a multilayer electronic component according to an embodiment of the present disclosure.

FIG. 8 is a view illustrating a method of manufacturing a multilayer electronic component according to an embodiment of the present disclosure. Referring to FIG. 8, as a specific example, cover portions C1 and C2 may be formed by stacking one or more ceramic green sheets GS to which no paste for internal electrodes is applied in upper and lower portions in the first direction, respectively. Ceramic green sheets 11 coated with paste P1 for internal electrodes having a high Sn amount may be disposed below a first cover portion C1 in the first direction and on a second cover portion C2 in the first direction, ceramic green sheets 12 coated with the internal electrode paste P2 for internal electrodes having a low or no Sn amount may be disposed therebetween, and a capacitance formation portion Ac may be stacked, to form a stack body. Thereafter, the stack body may be cut to fit a size of a multilayer electronic component, and may be sintered to form a body, and external electrodes may be formed on the body, to prepare the multilayer electronic component.

An external electrode (131 and 132) may be disposed on the third and fourth surfaces 3 and 4 of the body 110. External electrodes 131 and 132 may be disposed on the third and fourth surfaces 3 and 4 of the body 110, respectively, and may include first and second external electrodes 131 and 132 respectively connected 121 and 122. In this case, the external electrodes 131 and 132 may include a band portion extending to one or more of the first, second, fifth, and sixth surfaces of the body 110.

In the present embodiment, a structure in which the multilayer electronic component 100 has two external electrodes 131 and 132 will be described, but the number, shapes, and the like of the external electrodes 131 and 132 may depend on shapes of the internal electrodes 121 and 122, and may be changed for other purposes.

The external electrodes 131 and 132 may be formed using any material as long as they have electrical conductivity, such as metal, and a specific material may be determined in consideration of electrical characteristics, structural stability, and the like, and may further have a multilayer structure.

For example, the external electrodes 131 and 132 may include electrode layers 131a and 132a disposed on the body 110, and plating layers 131b and 132b formed on the electrode layers 131a and 132a, respectively.

As a more specific example of the electrode layers 131a and 132a, the electrode layers 131a and 132a may be sintered electrodes including a conductive metal and glass or resin-based electrodes including a conductive metal and a resin. In addition, the electrode layers 131a and 132a may be formed using a plating method, or may be formed using a deposition method such as a sputtering process, an atomic layer deposition (ALD), or the like.

In addition, the electrode layers 131a and 132a may have a form in which a sintered electrode and a resin-based electrode are sequentially formed on the body. In addition, the electrode layers 131a and 132a may be formed by transferring a sheet containing a conductive metal onto a body or by transferring a sheet containing a conductive metal onto the sintered electrode.

A material having excellent electrical conductivity may be used as the conductive metal included in the electrode layers 131a and 132a, and is not particularly limited. For example, the conductive metal may be at least one of nickel (Ni), copper (Cu), or an alloy thereof.

The plating layers 131b and 132b serve to improve mounting characteristics. Types of the plating layers 131b and 132b are not particularly limited, and may be plating layers containing at least one of Ni, Sn, Pd, or an alloy thereof, and may be formed as a plurality of layers.

For a more specific example of the plating layers 131b and 132b, the plating layers 131b and 132b may be Ni plating layers or Sn plating layers, and an Ni plating layer and an Sn plating layer may be sequentially formed on the electrode layers 131a and 132a. There may be a form in which an Sn plating layer, an Ni plating layer, and an Sn plating layer are sequentially formed. In addition, the plating layers 131b and 132b may include a plurality of Ni plating layers and/or a plurality of Sn plating layers.

A size of the multilayer electronic component 100 does not need to be particularly limited.

To achieve miniaturization and high capacitance at the same time, a thickness of the dielectric layer and a thickness of each of the internal electrodes should increase to increase the number of layers. Therefore, in a multilayer electronic component 100 having a size of 0603 (length×width, 0.6 mm×0.3 mm) or less, effects of improving reliability and insulation resistance according to the present disclosure may be more remarkable.

Therefore, when a length of the multilayer electronic component 100 is 0.66 mm or less and a width thereof is 0.33 mm or less, considering a manufacturing error, an external electrode size, or the like, an effect of improving reliability according to the present disclosure may be more remarkable. In this case, the length of the multilayer electronic component 100 may mean a maximum size of the multilayer electronic component 100 in the second direction, and the width of the multilayer electronic component 100 may mean a maximum size of the multilayer electronic component 100 in the third direction.

Figure 9:
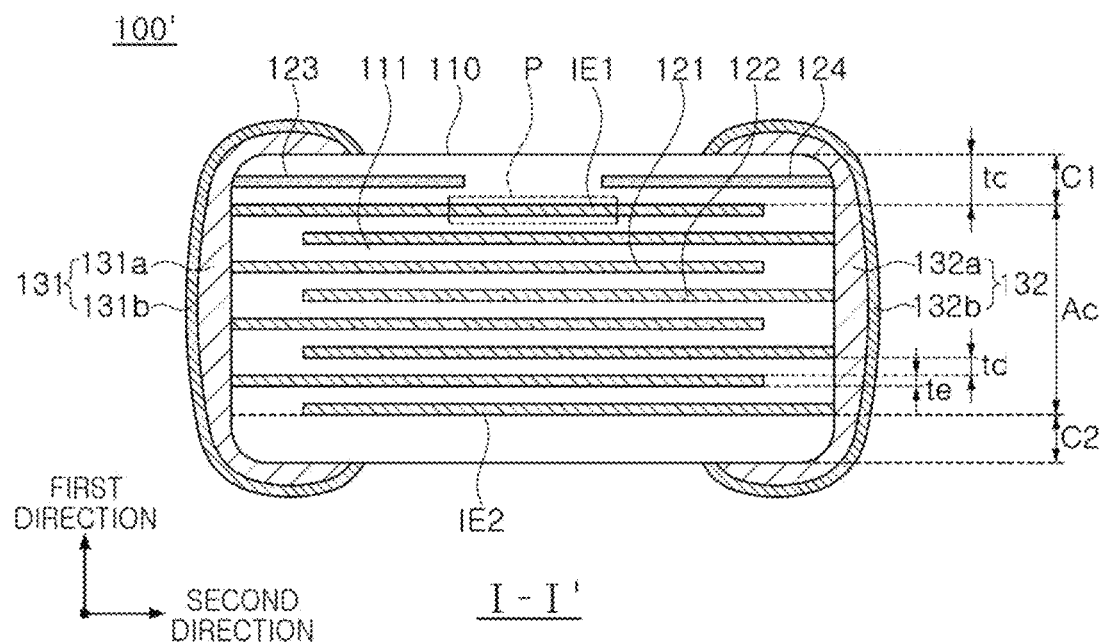
FIG. 9 is a cross-sectional view of a multilayer electronic component according to a modified example of the present disclosure, and is a view corresponding to FIG. 2.

FIG. 9 is a cross-sectional view of a multilayer electronic component 100' according to a modified example of the present disclosure, and is a view corresponding to FIG. 2.

Referring to FIG. 9, at least one of a first cover portion C1 or a second cover portion C2 may include dummy electrodes 123 and 124, and a molar ratio of Sn/(Ni+Sn) measured in a central portion of each of the dummy electrodes 123 and 124 may be 0.00160 or more and 0.0230 or less. Since the dummy electrodes 123 and 124 do not affect capacitance formation, reliability of a multilayer electronic component may be further improved without a decrease in capacitance.

In this case, external electrodes 131 and 132 may include a first external electrode 131 and a second external electrode 132, spaced apart from each other, and the dummy electrodes 123 and 124 may include a first dummy electrode 123 connected to the first external electrode, and a second dummy electrode 124 spaced apart from the first dummy electrode and connected to the second external electrode. Since moisture and the like may easily penetrate from upper and lower portions of a body in the first direction and may easily penetrate between the body and the external electrodes, the dummy electrodes 123 and 124 may further improve reliability as they are formed as a pair thereof connected to each of the first and second external electrodes 131 and 132.

Figure 10:
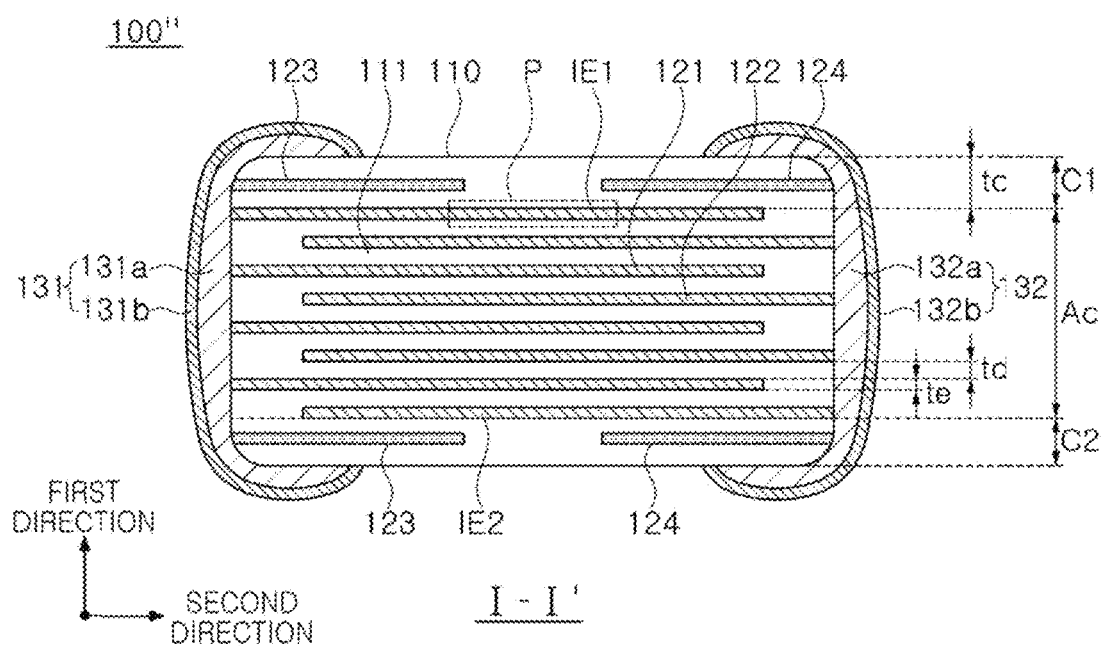
FIG. 10 is a cross-sectional view of a multilayer electronic component according to another modified example of the present disclosure, and is a view corresponding to FIG. 2.

FIG. 10 is a cross-sectional view of a multilayer electronic component 100" according to another modified example of the present disclosure, and is a view corresponding to FIG. 2.

Referring to FIG. 10, a first cover portion C1 and a second cover portion C2 may include dummy electrodes 123 and 124, respectively, and a molar ratio of Sn/(Ni+Sn) measured in a central portion of each of the dummy electrodes 123 and 124 may be 0.00160 or more and 0.0230 or less.

Since both the first cover portion C1 and the second cover portion C2 include the dummy electrodes 123 and 124, reliability may be further improved.

Furthermore, when both the first cover portion C1 and the second cover portion C2 include the dummy electrodes 123 and 124, a molar ratio of Sn/(Ni+Sn) respectively measured in central portions of internal electrodes 121 and 122 may be 0.00066 or less. For example, a multilayer electronic component 100" according to an embodiment of the present disclosure may include a body 110 including a capacitance formation portion Ac in which a plurality of dielectric layers 111 and a plurality of internal electrodes 121 and 122 are alternately disposed in a first direction, a first cover portion C1 disposed on one surface of the capacitance formation portion in the first direction and including a dielectric layer, and a second cover portion C2 disposed on the other surface of the capacitance formation portion in the first direction and including a dielectric layer; and an external electrode (131 and 132) disposed on the body. The first cover portion C1 and the second cover portion C2 may include dummy electrodes 123 and 124, a molar ratio of Sn/(Ni+Sn) measured in a central portion of each of the dummy electrodes 123 and 124 may be 0.00160 or more and 0.0230 or less, a molar ratio of Sn/(Ni+Sn) measured in a central portion of each of the internal electrodes may be 0.00066 or less. The present disclosure is not limited thereto, and may include IE1 and IE2, as described above.

Hereinafter, the present disclosure will be described in more detail through experimental examples, but this may be to help a detailed understanding of the present disclosure, and the scope of the present disclosure is not limited by the experimental examples.

EXPERIMENTAL EXAMPLES

Referring to FIG. 8, cover portions C1 and C2 were formed by stacking one or more ceramic green sheets GS to which no paste for internal electrodes is applied in upper and lower portions in the first direction, respectively. Ceramic green sheets 11 coated with paste P1 for internal electrodes were disposed below a first cover portion C1 in the first direction and on a second cover portion C2 in the first direction, ceramic green sheets 12 coated with the internal electrode paste P2 for internal electrodes were disposed therebetween, and a capacitance formation portion Ac was stacked, to form a stack body. Thereafter, the stack body was cut to fit a size of a multilayer electronic component, and may be sintered to form a body, and external electrodes were formed on the body, to prepare a sample chip. In this case, the paste P1 for internal electrodes was adjusted such that a molar ratio of Sn/(Ni+Sn) measured in a central portion of IE1 satisfies Table 1 below, and the paste P2 for internal electrodes was adjusted such that a molar ratio of Sn/(Ni+Sn) measured in a central portion of an internal electrode, except for IE1 and IE2, satisfies 0.00066.

Capacitance was measured for ten (10) sample chips per each test number, and an average value for each test number was obtained by measuring capacitance using an LCR meter under conditions of an AC voltage of 1 Vrms, and 1 kHz. Capacitance of Test No. 1 was set as a reference value of '100%,' and relative values for the capacitance of Test No. 1 were described for Test Nos. 2 to 9.

A mean-time-to-failure (MTTF) was measured for the ten (10) sample chips per each test number, a high-temperature load test was conducted under conditions of 165° C. and 7.5V, and a time point at which insulation resistance became 10 KΩ or less was determined as a failure time, to calculate an average value thereof.

A molar ratio of Sn/(Ni+Sn) of IE1 and IE2 and connectivity of the internal electrode were determined by polishing the sample chips to central portions thereof in the third direction to expose cross-sections in the first and second directions, and measuring in IE1. As illustrated in FIG. 7, a molar ratio of Sn/(Ni+Sn) was measured in a central portion of IE1 in the length direction, and was measured by performing quantitative analysis of Ni and Sn with STEM-EDS in a 'PP' region, a region spaced at least 20 nm from an interface with a dielectric layer. Since IE1 and IE2 were formed by using the paste P1, a moral ratio Sn/(Ni+Sn) of IE2 may be same as that of IE1.

TABLE 1

| Test No. | IE1, IE2 Sn/(Ni + Sn) | Capacitance(%) | IE1, IE2 Connectivity(%) | MTTF(hr) | MTTF |
|---|---|---|---|---|---|
| 1* | 0 | 100 | 79.1 | 25 | X |
| 2* | 0.00066 | 99.99 | 84.7 | 32 | Δ |
| 3 | 0.00160 | 99.98 | 80.0 | 39 | ○ |
| 4 | 0.00330 | 99.97 | 83.6 | 57 | ◉ |
| 5 | 0.00684 | 99.92 | 82.8 | 60 | ◉ |
| 7* | 0.02314 | 99.87 | 76.8 | 33 | Δ |
| 8* | 0.05073 | 99.84 | 69.4 | 22 | X |

In Test No. 2, a molar ratio of Sn/(Ni+Sn) of IE1 and IE2 was 0.0066, and connectivity of an internal electrode was improved, but MTTF did not change significantly. Therefore, a reliability improvement effect was insufficient.

Test Nos. 3 to 5, in which a molar ratio of Sn/(Ni+Sn) of IE1 and IE2 satisfies 0.00160 or more and 0.0230 or less, it was confirmed that connectivity of an internal electrode was 80% or more and the MTTF was greatly improved.

Test Nos. 7 and 8, in which a molar ratio of Sn/(Ni+Sn) of IE1 and IE2 exceeds 0.0230, it was confirmed that a melting point was too low and connectivity was rapidly reduced, and accordingly, MTTF was also reduced.

The present disclosure is not limited by the above-described embodiments and accompanying drawings, but is intended to be limited by the appended claims. Therefore, various forms of substitution, modification, and change will be possible by those skilled in the art within the scope of the technical spirit of the present disclosure described in the claims, and this will also be said to fall within the scope of the present disclosure.

In addition, the expression 'an embodiment' does not indicate the same embodiment, and is provided to emphasize and describe different unique characteristics. an embodiment presented above is not excluded from being implemented in combination with features of another embodiment. For example, even if a matter described in one detailed embodiment is not described in another embodiment, and it can be understood as a description related to another embodiment, unless there is a description contradicting or contradicting the matter in another embodiment.

Terms used in this disclosure may be only used to describe an embodiment, and may not be intended to limit the disclosure. In this case, singular expressions include plural expressions unless the context clearly indicates otherwise.

One of various effects of the present disclosure is to adjust Sn amounts of internal electrodes according to positions in which internal electrodes are disposed, to improve reliability of a multilayer electronic component One of various effects of the present disclosure is to adjust Sn amounts of internal electrodes according to positions in which internal electrodes are disposed, to improve connectivity of the internal electrode.

One of various effects of the present disclosure is is to adjust Sn amounts of internal electrodes according to positions in which internal electrodes are disposed, to suppress a decrease in capacitance due to addition of Sn.

Various advantages and effects of the present disclosure are not limited to the above description, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a capacitance formation portion in which a plurality of dielectric layers and a plurality of internal electrodes are alternately disposed in a first direction, a first cover portion disposed on one surface of the capacitance formation portion in the first direction and including a dielectric layer, and a second cover portion disposed on the other surface of the capacitance formation portion in the first direction and including a dielectric layer; and
at least one external electrode disposed on the body,
wherein, when, among the plurality of internal electrodes, an internal electrode disposed closest to the first cover portion is IE1 and an internal electrode disposed closest to the second cover portion is IE2, a molar ratio of Sn/(Ni+Sn) measured in at least one of a central portion of IE1 or a central portion of IE2 is 0.00160 or more and 0.0230 or less, and
a molar ratio of Sn/(Ni+Sn) measured in a central portion of at least one internal electrode, among the plurality of internal electrodes, is 0.00066 or less.

2. The multilayer electronic component of claim 1, wherein the molar ratio of Sn/(Ni+Sn) measured in at least one of the central portion of IE1 or the central portion of IE2 is 0.00160 or more and 0.00684 or less.

3. The multilayer electronic component of claim 1, wherein the molar ratio of Sn/(Ni+Sn) measured in at least one of the central portion of IE1 or the central portion of IE2 is 0.00330 or more and 0.00684 or less.

4. The multilayer electronic component of claim 1, wherein, among the plurality of internal electrodes, a molar ratio of Sn/(Ni+Sn) measured in a central portion of an internal electrode, other than IE1 and IE2, is 0.00066 or less.

5. The multilayer electronic component of claim 1, wherein the central portion is a region spaced by 20 nm or more from an interface with the dielectric layer.

6. The multilayer electronic component of claim 1, wherein, in each of the plurality of internal electrodes, an Sn amount in a region adjacent to an interface with the dielectric layer is twice larger or more than an Sn amount in a central portion of the corresponding internal electrode.

7. The multilayer electronic component of claim 6, wherein the region adjacent to the interface with the dielectric layer is a region within 5 nm from the interface with the dielectric layer, and the central portion of the corresponding internal electrode is a region spaced by 20 nm or more from the interface with the dielectric layer.

8. The multilayer electronic component of claim 1, wherein, among the plurality of internal electrodes, an internal electrode, other than IE1 and IE2, does not contain Sn.

9. The multilayer electronic component of claim 1, wherein the internal electrode comprises two or more conductive portions and a disconnection portion disposed between adjacent conductive portions of the two or more conductive portions,
wherein, when a ratio of the sum of lengths of the conductive portions relative to a total length of the internal electrode is referred to as connectivity for an internal electrode, the connectivity in the IE1 and IE2 is 80% or more.

10. The multilayer electronic component of claim 1, wherein, among the plurality of internal electrodes, a ratio of the number of internal electrodes of which a molar ratio of Sn/(Ni+Sn) measured in a central portion of each of the internal electrodes is 0.00066 or less is 90% or more.

11. The multilayer electronic component of claim 1, wherein, when a region of the capacitance formation portion adjacent to the first cover portion is K1, a region of the capacitance formation portion adjacent to the second cover portion is K2, and a region disposed between K1 and K2 is Kc,
a molar ratio of Sn/(Ni+Sn) measured in a central portion of an internal electrode included in K1 and K2 is 0.00160 or more and 0.0230 or less, and
a molar ratio of Sn/(Ni+Sn) measured in a central portion of an internal electrode included in Kc is 0.00066 or less.

12. The multilayer electronic component of claim 11, wherein a ratio of a maximum size of Kc in the first direction relative to a maximum size of the capacitance formation portion in the first direction is 0.9 or more.

13. The multilayer electronic component of claim 1, wherein at least one of the first cover portion or the second cover portion comprises at least one dummy electrode,
wherein a molar ratio of Sn/(Ni+Sn) measured in a central portion of the dummy electrode is 0.00160 or more and 0.0230 or less.

14. The multilayer electronic component of claim 13, wherein the at least one external electrode comprises first and second external electrodes spaced apart from each other,
wherein the at least one dummy electrode includes a first dummy electrode connected to the first external electrode, and a second dummy electrode disposed spaced apart from the first dummy electrode and connected to the second external electrode.

15. The multilayer electronic component of claim 14, wherein an average thickness of at least one of the internal electrodes is 0.35 μm or less.

16. The multilayer electronic component of claim 1, wherein an average thickness of at least one of the dielectric layers is 0.37 μm or less.

* * * * *